No. 856,327. PATENTED JUNE 11, 1907.
W. T. WITHERS.
LOAD BINDING DEVICE.
APPLICATION FILED SEPT. 13, 1906.
2 SHEETS—SHEET 1.
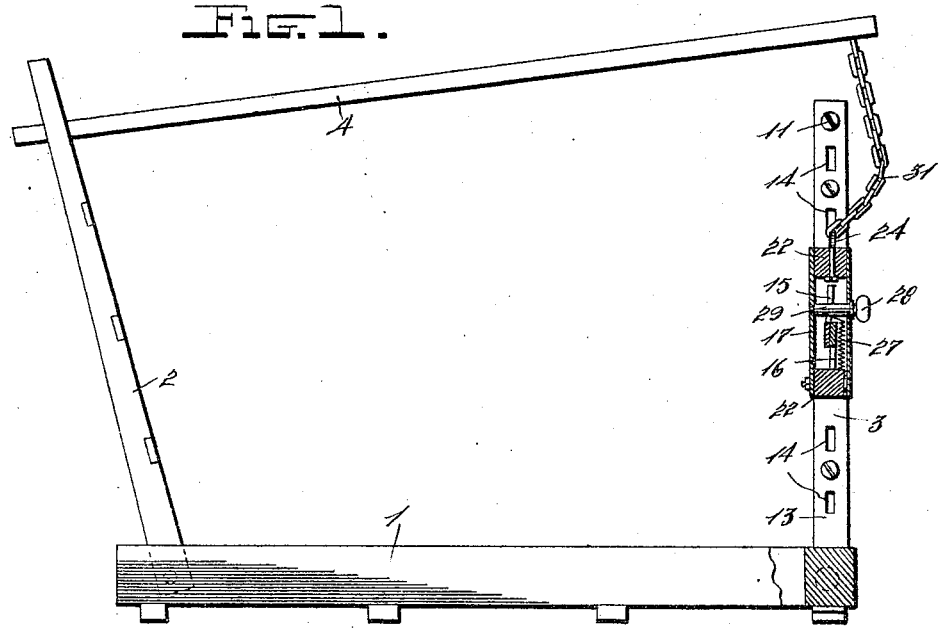
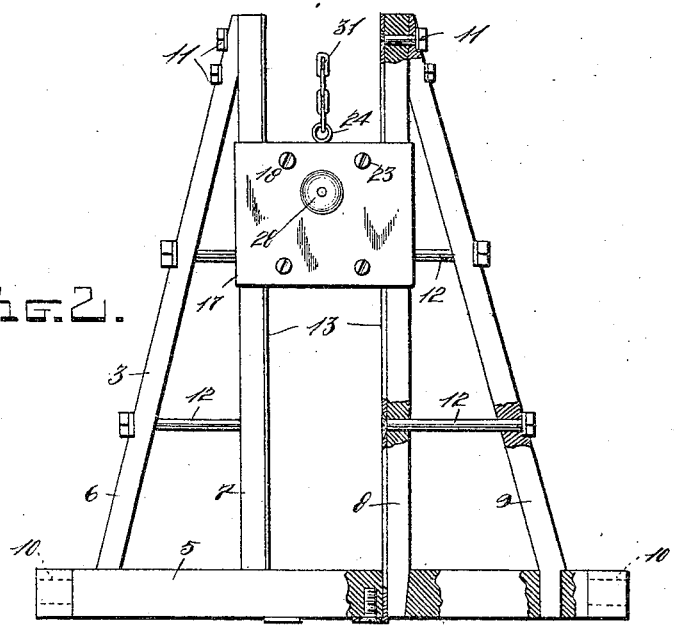
Witnesses
Inventor
William T. Withers.
by Attorneys No. 856,327. PATENTED JUNE 11, 1907.
W. T. WITHERS.
LOAD BINDING DEVICE.
APPLICATION FILED SEPT. 13, 1906.

2 SHEETS—SHEET 2.

Witnesses
Inventor
William T. Withers
by Attorneys

UNITED STATES PATENT OFFICE.

WILLIAM T. WITHERS, OF EVANSVILLE, INDIANA.

LOAD-BINDING DEVICE.

No. 856,327.  Specification of Letters Patent.  Patented June 11, 1907.

Application filed September 13, 1906. Serial No. 334,516.

*To all whom it may concern:*

Be it known that I, WILLIAM T. WITHERS, a citizen of the United States, residing at Evansville, in the county of Vanderburg and State of Indiana, have invented certain new and useful Improvements in Load-Binding Devices; and I do declare the following to be a full, clear, and exact description of the invention, such as will enable others skilled in the art to which it appertains to make and use the same.

This invention relates to improvements in frames for hay wagons and in devices for binding loads of hay or the like on said frames.
The object of the invention is to improve and simplify the construction and operation of devices of this character, and thereby render the same more durable and efficient.

With the above and other objects in view, the invention consists in the construction, combination and arrangement of parts hereinafter described and claimed.

Figure 3:
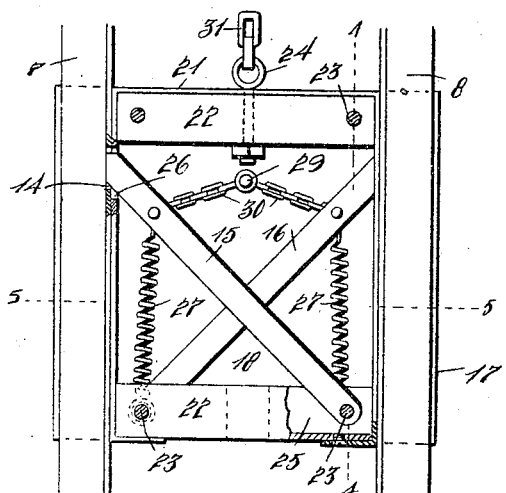
Figure 4:
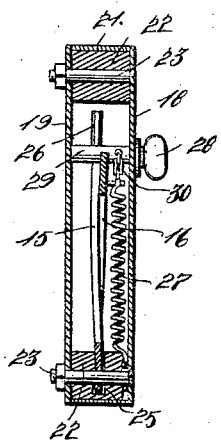
Figure 5:
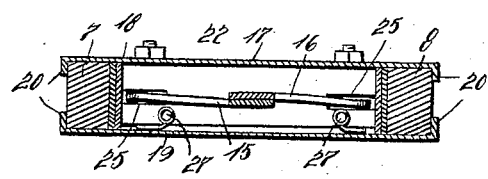

In the accompanying drawings,—Figure 1 is a vertical, longitudinal sectional view through the frame of a hay wagon, showing the application of the invention thereto; Fig. 2 is an end elevation of the same, parts being broken away to more clearly illustrate the construction; Fig. 3 is a detail vertical sectional view, showing the pawl and ratchet mechanism by means of which the binding slide is adjusted; Fig. 4 is a detail vertical sectional view, taken on the plane indicated by the line 4—4 in Fig. 3; and Fig. 5 is a horizontal sectional view, taken on the plane indicated by the line 5—5 in Fig. 3.

Referring to the drawings by numeral, 1 denotes a hay frame of any suitable form and construction. At the opposite ends of the frame 1 are provided the usual upright end sections 2, 3, which are adapted to be connected by a load binding bar 4 or by a chain or cable, which is used in place of the bar 4.

In the practice of my invention, I construct the upright end section 3 of a horizontal cross beam or bar 5, and four uprights 6, 7, 8 and 9. The lower base bar 5 has its ends reduced to form cylindrical journals 10, which are mounted in suitable bearings in the frame 1, so that the section 3 is mounted to swing longitudinally. The two inner uprights 7, 8, are suitably spaced apart and project at right angles from the base bar 5, so that they are parallel with respect to each other; and the outer uprights 6, 9, are inclined inwardly, their lower ends being secured to the base bar 5, adjacent to its ends and their upper ends being beveled and bolted, as at 11, upon the outer faces of the uprights 7, 8, as clearly shown in Fig. 2. The uprights 6, 7, and the uprights 8, 9, are connected by tie bolts or rods 12, and serve as steps to enable the driver to climb to the top of the load on the frame. Secured upon the inner opposing faces of the inner uprights 7, 8, are metal straps 13, formed at suitable intervals with slots or recesses 14, so that said straps serve as rack bars. Coacting with the latter are pivoted dogs or pawls 15, 16, arranged within a vertically-movable slide 17, which slides upon the two uprights 7, 8. The slide 17, as shown in Figs. 3 and 5, comprises two cover plates 18, secured upon the opposite faces of a rectangular frame 19, which slides between the two racks upon the uprights 7, 8. The ends of the plates 18 project beyond the ends of the frame 19 and engage the opposite faces of the uprights 7, 8, and they are formed with right-angularly bent flanges 20, which latter engage the outer faces of said uprights and serve to more effectively guide the slide upon the same. The frame 19 is constructed of a metal strip or plate 21, bent into rectangular form and having secured in its upper and lower end blocks 22. Fastening screws or bolts 23 pass through the cover plates 18 and the blocks 22 to secure the said parts together, and extending vertically through the upper block 22 and the top portion of the plate 21 is an eye-bolt 24.

The pawls 15, 16, are in the form of straight metal bars arranged across each other and having their lower ends projecting into recesses or seats 25, formed in the lower block 22. These lower ends of the pawls are apertured to receive the bolts 23 in said block 22, said bolts thus serving as pivots for the pawl. The beveled upper ends of the pawls work through vertically-extending slots 26 formed in the side portions of the strip 21, and they are adapted to be projected into the recesses or seats 14 in the straps 13, by coil springs 27. Each of these springs has its upper end secured to a stud upon one of the pawls and its lower end formed with an eye, through which the bolts 23 in the lower block 22 pass. The pawls are adapted to be retracted by turning a knob 28 upon the outer end of a shaft 29, which is mounted for rotation in the two cover plates 18. The intermediate portion of the shaft 29 is connected to the two pawls by chains or suitable connections 30, so that when said shaft is rotated, said chain will be wound in opposite directions thereon to retract the beveled upper ends of the pawls from the seats or recesses 14.

The slide 17 is adapted to be connected to the binding bar or pole 4, by a chain or the like 31, which is preferably attached to the eye of the bolt 24.

In operation, the pole or bar 4 is placed upon the top of the load and the slide 17 is forced downwardly between the two uprights 7, 8. As it moves downwardly, the projecting upper ends of the pawls 15, 16, will drop into the recesses or seats 14 and hold said slide in its adjusted position. In order to release the binding device, the knob of the shaft 29 is rotated to retract the pawl, as previously stated. It will be seen that by means of this device, one man may effectively secure a load upon the wagon frame.

Various changes in the form, proportion, and the minor details of construction may be resorted to without departing from the principle or sacrificing any of the advantages of the invention, as defined by the appended claims.

Having thus described my invention, what I claim as new, and desire to secure by Letters-Patent, is,—

1. The combination with a hay wagon frame having a horizontal body, an upright section at one end thereof, and a load binding element, of an upright section at the other end of said body and comprising parallel members, racks upon the opposing faces of said parallel members, a slide mounted for longitudinal movement upon said members, pawls carried by said slide to engage said racks, and means for connecting said slide to said binding element.

2. The combination with a hay wagon frame having a horizontal body, an upright section at one end thereof, and a load binding element, of an upright section at the other end of said body and comprising parallel members, racks upon the opposing faces of said parallel members, a slide mounted for longitudinal movement upon said members, crossed pawls pivoted in said slide and adapted to engage said racks, springs for projecting said pawls, a shaft in said slide, flexible connections between said shaft and said pawls for retracting the latter, and means for connecting said slide to said binding element.

3. The combination with a hay wagon frame having an upright section at one end, and a load binding element, of a pivotally mounted upright section at the other end of said frame, the latter section comprising a horizontal base bar, spaced, parallel uprights projecting therefrom, inwardly-inclined uprights connecting the parallel uprights and the base bar, and tie rods connecting said uprights and forming steps, racks upon the opposing faces of said parallel uprights, a slide mounted upon said parallel uprights and carrying pawls to engage said racks, and means connecting said slide to said binding element.

In testimony whereof I have hereunto set my hand in presence of two subscribing witnesses.

WILLIAM T. WITHERS.

Witnesses:
   O. C. PURDUE,
   G. Z. WRIGHT.